US006252942B1

(12) United States Patent
Zoiss et al.

(10) Patent No.: US 6,252,942 B1
(45) Date of Patent: Jun. 26, 2001

(54) WIRELESS BUTT SET

(75) Inventors: Edward J. Zoiss, Moorpark; Ronald S. Squires, Agoura Hills; Glen H. Humphrey, North Hills; James D. Coleman, Malibu; Linda L. Hathorn, Camarillo, all of CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/124,585

(22) Filed: Jul. 29, 1998

Related U.S. Application Data

(60) Provisional application No. 60/054,283, filed on Jul. 30, 1997.

(51) Int. Cl.[7] .............................. H04M 1/24; H04M 3/08; H04M 3/22
(52) U.S. Cl. .............................. 379/21; 379/19; 455/423
(58) Field of Search .................................. 455/423–425; 379/1, 6, 10, 15, 19, 21, 26–29, 30, 32, 34

(56) References Cited

U.S. PATENT DOCUMENTS

| 3,708,634 | * | 1/1973 | Vantill et al. | 379/21 |
|---|---|---|---|---|
| 3,792,205 | | 2/1974 | O'Dea | 179/175 |
| 4,691,336 | * | 9/1987 | Durston | 379/21 |
| 5,014,302 | | 5/1991 | Kappeler et al. | 379/165 |
| 5,581,599 | * | 12/1996 | Tsuji et al. | 455/415 |
| 5,778,050 | * | 7/1998 | Park, II | 379/21 |

FOREIGN PATENT DOCUMENTS

| WO 97/42743 | 11/1997 | (WO) | H04M/1/00 |
|---|---|---|---|
| WO95/30298 | 11/1997 | (WO) | H04M/3/30 |

OTHER PUBLICATIONS

Harry Newton, Newton's Telecom Dictionary, 8th Edition, Copyright 1994, pp. 167–168.*

* cited by examiner

*Primary Examiner*—Duc Nguyen
(74) *Attorney, Agent, or Firm*—Allen, Dyer, Doppelt, Milbrath & Gilchrist, P.A.

(57) ABSTRACT

A wireless butt set for testing a telephone line includes a base station that is connectable to tip and ring leads of a line under test and is configured to be operated by a wireless telephone handset. The handset is detachably nestable with the base station to form a hand-held integrated butt set assembly. This configuration allows a craftsperson to directly or remotely control the test set using controls of the wireless telephone handset. The internal circuitry of the base station is placed in a high impedance line-monitoring mode without going off-hook, in response to one 'click' of a talk switch of the handset, and goes off-hook in response to a 'double-click' of the talk switch the handset.

19 Claims, 3 Drawing Sheets

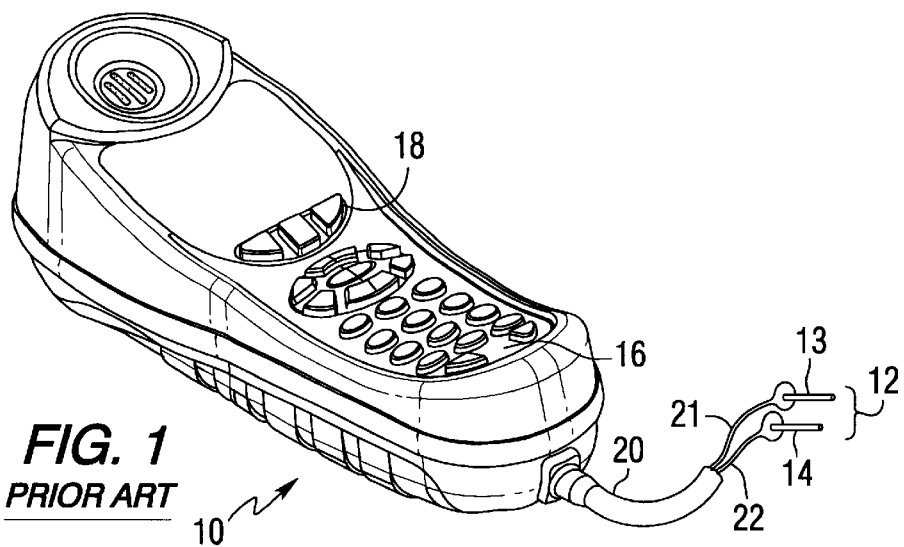
FIG. 1
PRIOR ART
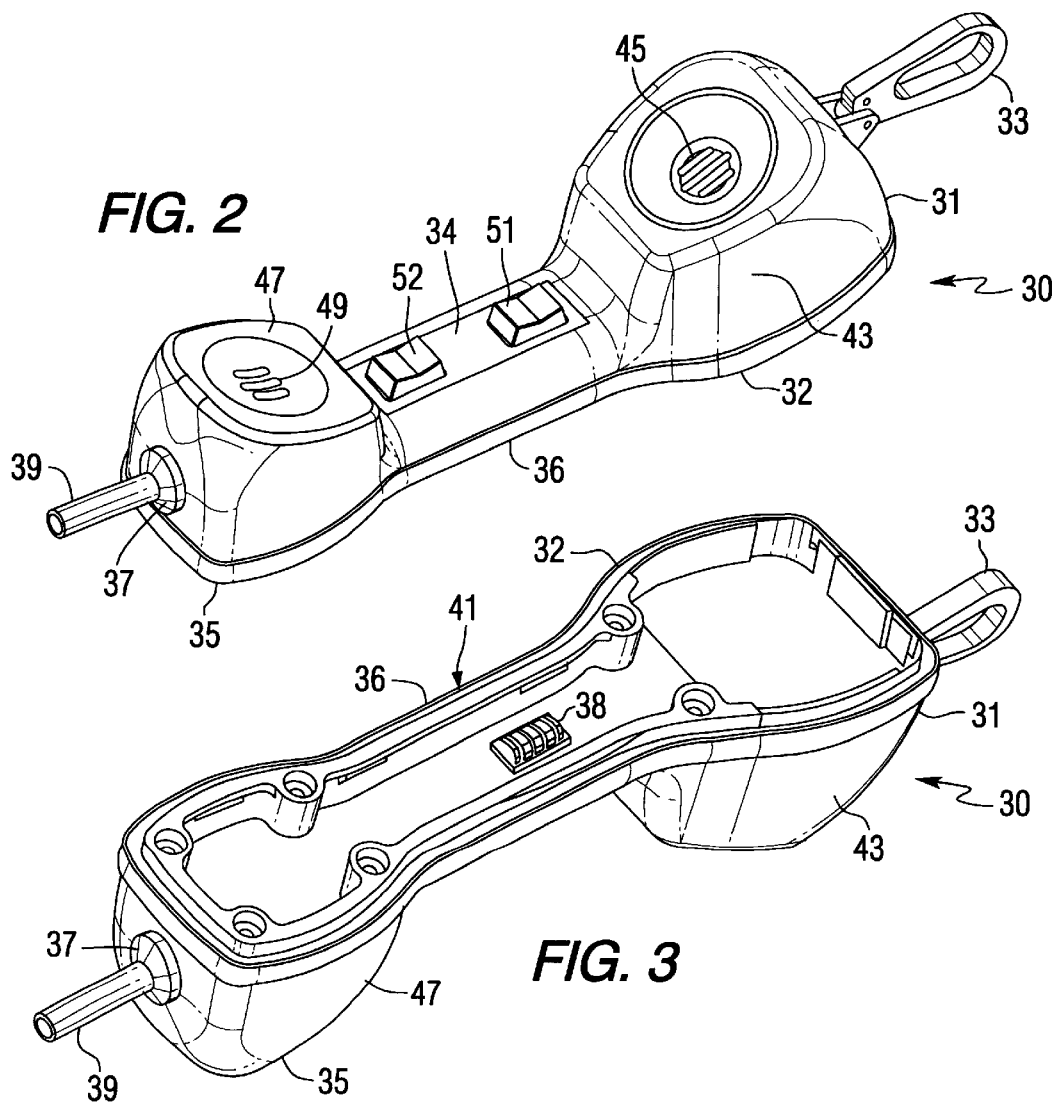
FIG. 2
FIG. 3

WIRELESS BUTT SET

CROSS-REFERENCE TO RELATED APPLICATION

The present application claims the benefit of U.S. Provisional Patent Application Ser. No. 60/054,283, filed Jul. 30, 1997, entitled: "Wireless Buttset," the disclosure of which is incorporated herein.

FIELD OF THE INVENTION

The present invention relates in general to communication systems and is particularly directed to a new and improved craftsperson's test set, that is configured of an integrated combination of hand-held test set base station and a detachable wireless handset. Such a 'wireless butt set' architecture allows the craftsperson to connect the test set's base station, in which the test set functionality resides, to a telephone line under test, and then control the operation of the test set via a wireless phone which may be retained with or removed from the base station to facilitate movement of the craftsperson.

BACKGROUND OF THE INVENTION

For testing and troubleshooting a telephone line, telephone network service personnel, or craftspersons, have conventionally employed what is essentially a ruggedized version of a standard telephone handset, commonly termed a 'butt set', such as that diagrammatically illustrated shown at 10 in FIG. 1. Access to a telephone circuit under test 12 is customarily afforded by way of its tip and ring leads 13 and 14, to which the craftsperson electrically and mechanically couples a pair of test leads 21 and 22 of the test set's line cord 20. Once so connected, the internal circuitry of the butt set is operative to controllably execute monitoring and testing functions, as selectively directed by the craftsperson (using the test set's keypad 16 and/or one or more auxiliary switches 18).

Now although a standard butt set architecture allows a craftsperson to test a line from any point to which access is provided, it does not allow the craftsperson freedom of movement during a troubleshooting operation, such as in those cases where it is necessary to physically follow a line through a conduit or a wall of a building, and may not readily facilitate operation (manipulation of the keys/switches) of the butt set, particularly at a line connection location where access is physically restricted.

SUMMARY OF THE INVENTION

In accordance with the present invention, these and other shortcomings of a conventional butt set are obviated by a new and improved 'wireless' butt set architecture, that is configured as an integrated combination of a test set base station and a detachable wireless handset. This combined test set architecture readily enables a service technician to test a telephone line, without requiring that the craftsperson remain where the test set is physically connected to the line, thereby facilitating movement of the craftsperson as necessary to a location that may well beyond the reach of the test set's line cord.

For this purpose, the test set base station and its associated wireless telephone handset are configured to interfit physically and electrically engage one another as an integrated assembly, that is comfortably hand-held by the user. In addition to containing the test set circuitry of a conventional telephone test set, and associated transceiver circuitry of a standard wireless telephone cradle, the wireless butt set base station contains auxiliary 'double-click' talk/monitor, battery charging and DC—DC converter circuits.

The detachable wireless handset contains rechargeable battery operated wireless telephone circuitry, and is configured to comfortably fit in the user's hand. The wireless handset is also contoured to rest upon and has a roughened non-skid pattern molded into its outer surface to prevent the unit from slipping on the shoulder of the user. The handset has a multipin electrical receptacle that mates with an associated multipin electrical connector installed in the base station when the base station and the wireless phone are joined together, so as to provide a hardwired connection between the communication transceiver components of the base station and those of the wireless phone section, and thereby allow the wireless butt set to operate as a conventional non-wireless butt set.

The auxiliary circuitry of the base station enables the talk/monitor mode functionality of the test set to be controlled by the standard talk mode switch of the wireless phone. The normal talk switch circuit path is modified to place the talk mode signalling path in a loop that includes the wireless transceiver of the wireless phone, that of the base station, and a 'double-click' talk mode circuit within the auxiliary base station circuitry. In response to only a single operation of the talk mode switch of the wireless phone within a prescribed monitor mode window, an auxiliary transformer—high impedance bridge circuit monitors the line, i.e., the tip/ring pair to which the craftsperson has connected the test leads of the base station.

The output of the auxiliary transformer—high impedance bridge circuit is summed in with the normal circuit path of the receiver transformer of the base station, so that the auxiliary transformer—high impedance bridge circuit is effectively coupled in parallel with the receiver transformer of the base station's transmit—receiver transformer windings. The auxiliary transformer—high impedance bridge circuit allows the craftsperson to monitor the state of the line from the wireless phone, without going off-hook, so that the technician can determine whether the line under test is in use without disturbing an existing voice circuit thereover. If the line is in use, the craftsperson may simply wait until a later time to check the line. Without a repeated toggling of the talk switch within the time-out window, the double-click circuit resets. Double-clicking the wireless phone's talk mode switch within the prescribed monitor window causes the base station's microcontroller to place the test set in the off-hook mode, allowing full-duplex use of the line via the wireless handset.

The auxiliary base station circuitry also includes a battery charging circuit through which a set of rechargeable batteries for powering the base station may be charged from an external power source, such as an AC-DC voltage converter module plugged into a conventional 110 VAC power source. Coupled with the battery supply is a DC—DC converter for converting the battery voltage to the requisite DC voltage level required to power the electronic circuitry of the base station. This battery power source enables a service technician to operate the wireless butt set, and thus test a telephone line at effectively any accessible location, such as a closet or telephone pole, where the craftsperson will probably not have ready access to a conventional power source.

BRIEF DESCRIPTION OF THE DRAWINGS

FIG. 1 diagrammatically illustrates a standard telephone 'butt set' for testing and troubleshooting a telephone line;

FIG. 2 is diagrammatic perspective view of the speaker/mic side of a base station of the 'wireless' butt set of the present invention;

FIG. 3 is diagrammatic perspective view of the wireless phone attachment side of the base station of FIG. 2;

DETAILED DESCRIPTION

Figure 4:
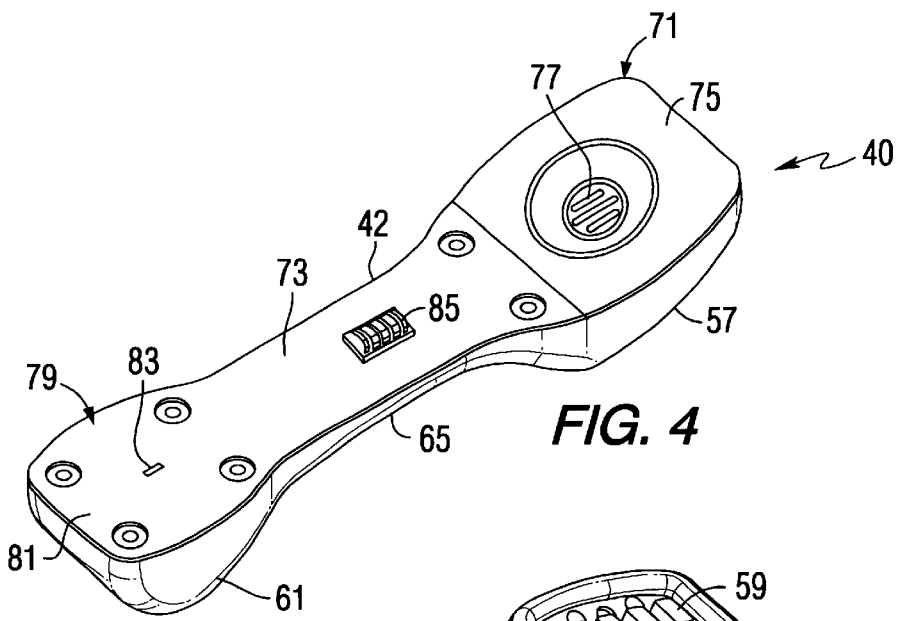
FIG. 4 is diagrammatic perspective view of the speaker/mic side of the wireless phone of the 'wireless' butt set of the present invention.
Figure 5:
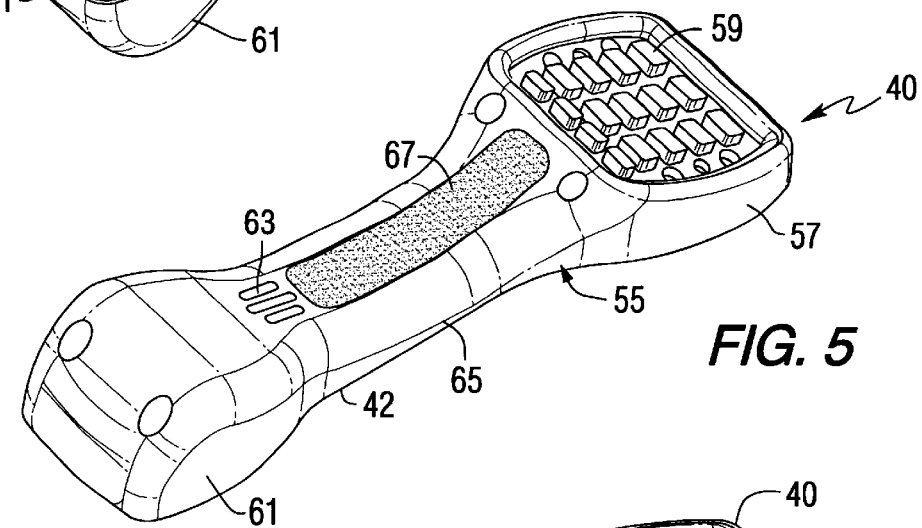
FIG. 5 is diagrammatic perspective view of the keypad side of the wireless phone of FIG. 4.

Before describing the details of a non-limiting, preferred embodiment of the wireless butt set of the present invention, it should be observed that the invention resides primarily in what is effectively a prescribed physical and electrical communication interconnection architecture of: 1) a test set base station, which houses the test functionality of a standard butt set, and through line cord leads of which the test set may be connected to (tip and ring) leads of the telephone circuit under test, and 2) a wireless telephone handset, that is configured to 'nest' with and be removable from the test set base station, so as to allow the craftsperson to operate the butt set in the manner of operating a standard butt set or to remotely control the operation of the base station using the detached wireless handset.

Each of the test set base station and the wireless telephone handset contains conventional communication circuits and associated digital signal processing components and an attendant supervisory control program therefor, that controls the operations of such circuits and components. Consequently, the configuration of such circuits and components and the manner in which they are interfaced with one another have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block illustrations and circuit diagram to be described are primarily intended to show the major components of the wireless butt set in a convenient functional grouping, so that the present invention may be more readily understood.

Figure 6:
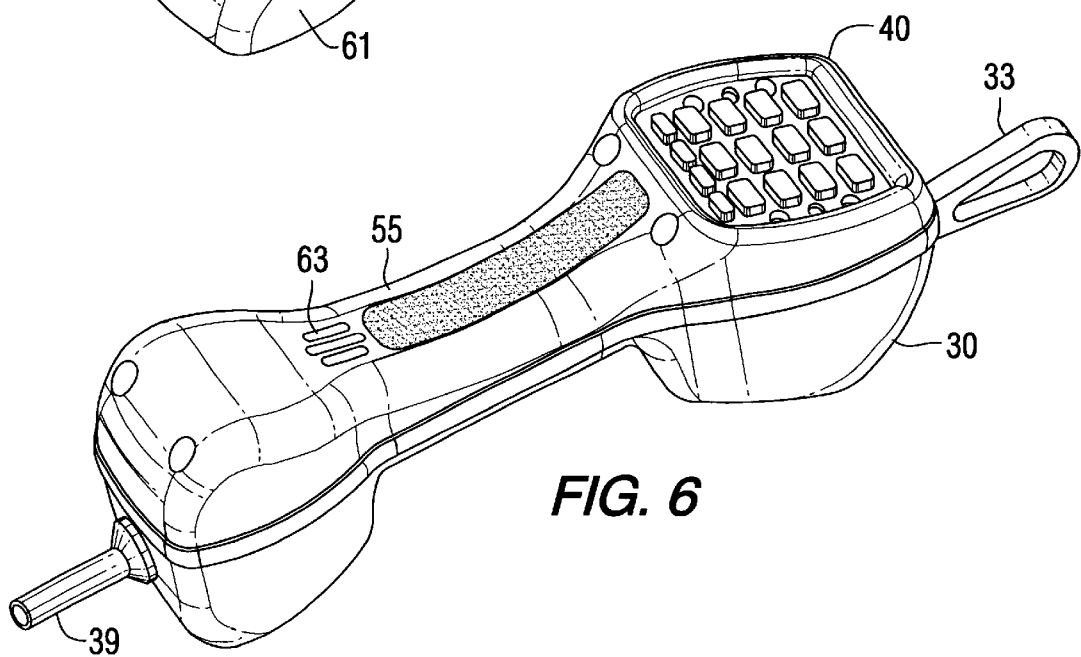
FIG. 6 is diagrammatic perspective view of the integrated assembly configuration of the base station of FIGS. 2 and 3 and the wireless phone of FIGS. 4 and 5.

The physical configuration of the wireless butt set of the present invention is diagrammatically illustrated in FIGS. 2–6, as comprising a test set base station 30 and an associated wireless telephone 40, which are configured to interfit physically and electrically engage one another as an integrated assembly, shown in FIG. 6, thereby forming respective rear and front portions of the overall wireless butt set architecture. For this purpose, the base station 30 and wireless phone 40 have complementarily contoured (ridge and groove) perimeters 32 and 42 that facilitate joining the two units together into a unified, butt set structure, that is comfortably hand-held by the user.

In addition to containing the test set circuitry of a conventional telephone test set, such as but not limited to that of a Harris Test Set Model No. TS50, and associated transceiver circuitry of a standard wireless telephone cradle, such as that for a Uniden wireless telephone, Model No. EXP900, the base station 30 contains auxiliary talk/monitor, battery charging and DC—DC converter circuits, to be described with reference to FIG. 7.

The base station 30 is generally of conventional hand-held test set configuration and construction, having a first, top end 31, to which a craftsperson's belt clip 33 is attached, a second, bottom end 35 having a line cord access port 37, from which a line cord 39 extends for attachment to (tip and ring leads of) a telephone circuit under test, and a third, central section 36 that is intermediate the top and bottom ends and is configured to fit comfortably in the hand of the user.

The top end 31. of the base station 30 has an earpiece section 43 housing the test set's earpiece-receiver beneath a receiver grill 45. The bottom end 35 has a mouthpiece section 47 housing the test set's microphone-transmitter beneath a microphone grill 49. The front face 34 of the central section 36 of the base station contains one or more test set switches, such as those associated with the standard tone/pulse dialing and talk/monitor mode functions of the test set, shown at 51 and 52.

The detachable wireless phone 40, which contains rechargeable battery operated circuitry of a conventional wireless telephone, such as but not limited to the above-referenced Uniden Model No. EXP900, includes a front face portion 55 having a first, top end 57 containing a keypad 59, a second, bottom end 61 containing a grill 63 beneath which the phone's ringer is located, and a third, central section 65 intermediate the top and bottom ends. Like the central section 36 of the base station 30, the central section 65 of the wireless phone 40 is configured to allow both the wireless phone 40, per se, and the two joined together units 30 and 40 to comfortably fit in the user's hand. The front face 55 of the central section 65 of the wireless phone 40 is also contoured to rest on the shoulder of the user, and has a roughened non-skid pattern 67 molded into its outer surface to prevent the unit from slipping.

The top end 71 of the rear face 73 of the wireless phone 40 has an earpiece section 75, that contains an earpiece-receiver beneath a receiver grill 77. The bottom end 79 of the wireless phone has a mouthpiece section 81, that houses a microphone-transmitter beneath a microphone grill 83. The rear face 73 of the central section 65 contains a multipin electrical receptacle 85, that is configured to mate with an associated multipin electrical connector 38 installed in the rear face 41 of the central section 36 of the base station 30, when the base station 30 and the wireless phone 40 are placed together and retained in the integrated assembly configuration of FIG. 6.

Selected pins of the receptacle 85 and the connector 38 may be employed to provide a hardwired connection between the communication transceiver components of the base station 30 and those of the wireless phone section 40, when the two units are joined together. When such hard-wired pin paths are so provided, connector-operated switches (not shown) may be installed in each of the (base station and wireless telephone) units, to by-pass the radio link between the wireless phone section 40 and the base station 30, so that a direct hardwired digital communication link is provided between the micro-controllers of the two halves of the butt set. In this assembled, 'non-wireless' configuration, the wireless butt set of the invention operates just like any conventional non-wireless butt set.

Figure 7:
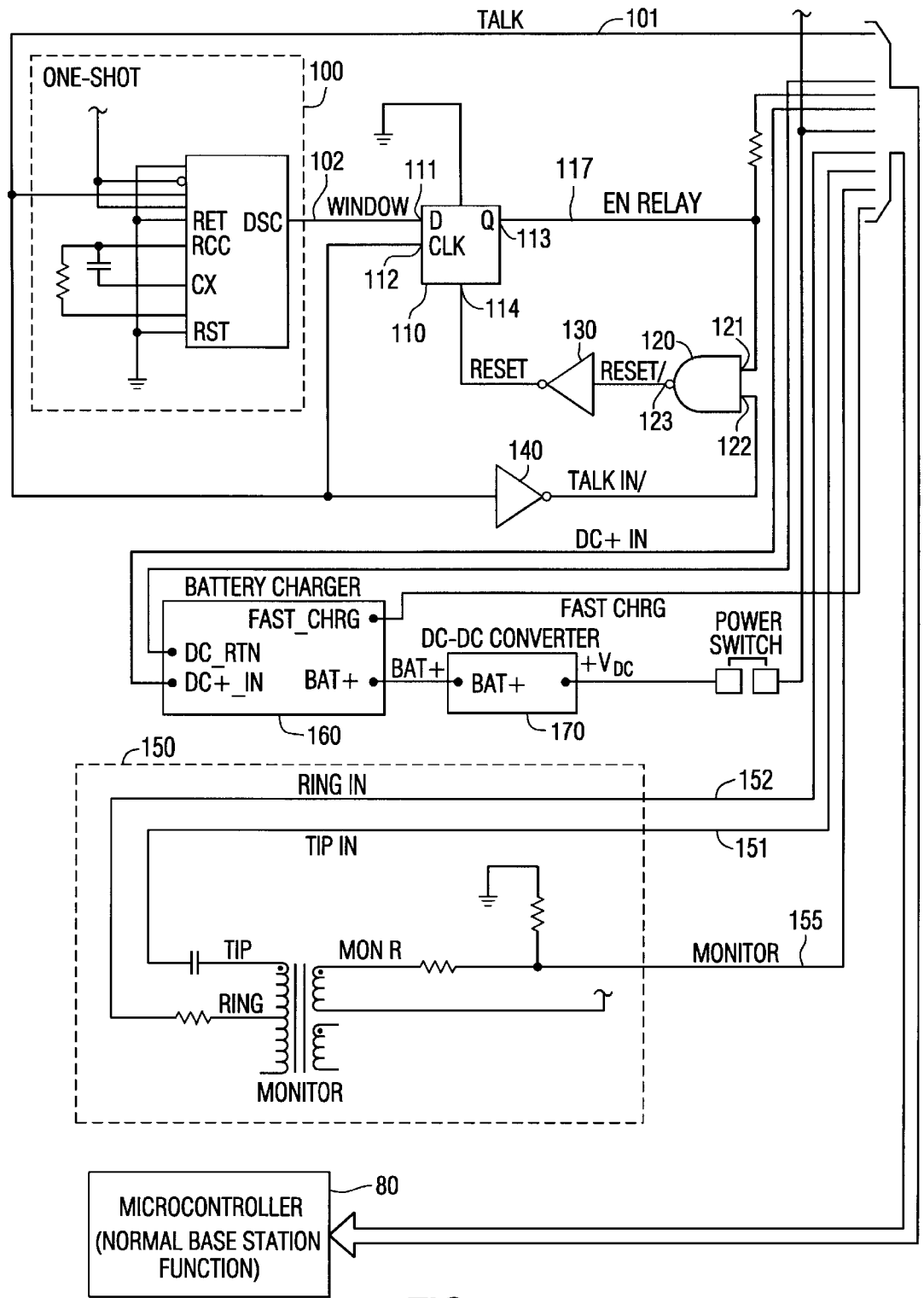
FIG. 7 diagrammatically illustrates auxiliary circuitry of the base station of the wireless butt set of the invention for enabling talk/monitor mode functionality of the test set to be controlled by the talk switch of the detachable wireless phone.

FIG. 7 diagrammatically illustrates auxiliary circuitry that is incorporated into the base station portion 30 of the wireless butt set of the present invention for enabling the talk/monitor mode functionality of the test set to be controlled by the standard talk mode switch of the wireless phone. The circuit path from the talk switch of a standard wireless telephone is such that operation of the talk switch causes the wireless phone's microcontroller to activate the full duplex audio/voice capability of the phone. In accordance with the present invention, this talk switch circuit path within the wireless phone is modified to place the talk mode signalling path in a loop that includes the wireless transceiver of the wireless phone, that of the base station, and a 'double-click' talk mode circuit within the auxiliary base station circuitry of FIG. 7. In addition, the auxiliary circuitry includes battery charging and DC—DC converter circuits for providing battery power to the test set, so as to obviate the need to power the test set from an AC-DC voltage converter module that has been plugged into a conventional 110 VAC power source.

In order to control monitor and talk modes of operation of the test set from the wireless phone, the talk signal path 101 from the base station's microcontroller, shown at 80, is coupled to a 'double-click' circuit that includes a one-shot 100, the output ('window') 102 of which is coupled to the D input 111 of a clocked flip-flip 110. The base station's microcontroller receives talk/monitor input signals from both a talk signal input path from a standard talk/monitor switch of the test set base station 30 (such as that shown at 52 in FIG. 2, referenced above), and from data contained in the encoded data signals transmitted from the wireless telephone 40.

The talk signal circuit path 101 is further coupled to the clock input 112 of the flip-flip 110. The Q output 113 of the flip-flop 110 is coupled via a resistor 115 to a talk output signal (or energize relay) circuit path 117 to the base station microcontroller 80, and also to a first input 121 of a NAND gate 120, the output 123 of which is coupled through an inverter 130 to the reset or clear terminal 114 of flip-flop 110. A second input 122 of NAND gate 120 is coupled through an inverter 140 to the talk signal input circuit path 101. The function of one-shot 100 is to require an additional or repeated activation (or 'double-click') of the wireless phone's talk switch within a prescribed timing 'window' (e.g., 1.5 sec.) after an initial activation of the wireless phone's talk switch, in order to place the test set in an off-hook condition, and thereby allow the user to conduct full-duplex communications with the line under test.

Namely, in response to an initial change in state of the talk signal path 101, as a result of the operation of the talk mode switch of the wireless phone section 40, the output 102 of the one-shot 100 changes state (from low to high). When the wireless phone's talk switch is initially operated, the output 102 of the (reset) one-shot 110 is at a first binary state or low, so that when the flip-flop 110 is clocked by this initial talk signal, its Q output 113 remains low. In this state, by means of an auxiliary transformer—high impedance bridge circuit 150 coupled to tip/ring lines 151/152, the test set base station 30 is operative to monitor the line (tip/ring pair) to which the craftsperson has connected the test leads of the base station 30.

For this purpose, the output 153 of the auxiliary transformer—high impedance bridge circuit 150 is coupled via a monitor output line 155 and is summed in with the normal circuit path of the receiver transformer of the base station. Thus, the auxiliary transformer—high impedance bridge circuit 150 is effectively coupled in parallel with the receiver transformer of the base station's transmit—receiver transformer windings. As a consequence, the auxiliary transformer—high impedance bridge circuit 150 allows the craftsperson to monitor the state of the line (tip/ring pair) to which the craftsperson has connected the test leads of the base station 30, without going off-hook, so that the technician can determine whether the line under test is in use without disturbing an existing voice circuit thereover. If the line is in use, the craftsperson may simply wait until a later time to check the line. Without a repeated toggling of the talk switch within the time-out window, the double-click circuit resets.

If the (wireless phone's) talk mode switch is double-clicked or operated again (clocking the flip-flop 110) within the prescribed timing window, since the logical state output 102 of the one-shot 110 was already changed from low to high by the initial activation of the talk switch, the Q output 113 of the flip-flop 110 now changes from low to high. This change in state of the Q output 113 of the flip-flop 110 signals the base station's microcontroller 80 to place the test set in the off-hook mode, and allowing full-duplex use of the line by the craftsperson.

In addition to the double-click monitor mode/off-hook mode circuit described above, the auxiliary base station circuitry of FIG. 7 also includes a battery charging circuit 160, through which a set of rechargeable batteries for powering the base station may be charged from an external power source, such as an AC-DC voltage converter module plugged into a conventional 110 VAC power source. Coupled with the battery supply is a DC—DC converter 170 for converting the battery voltage to the requisite DC voltage level required to power the electronic circuitry of the base station. As pointed out earlier, this auxiliary power source enables a service technician to readily operate the wireless butt set, and thus test a telephone line at effectively any accessible location, such as a closet or telephone pole, where the craftsperson will probably not have ready access to a conventional power source.

As will be appreciated from the foregoing description, the limited ability of a conventional unitary butt set to ensure ease of operation at any line connection location, particularly one where physical access to the line is restricted, or to allow a craftsperson servicing a line substantial freedom of movement beyond the line access point during a troubleshooting operation, are effectively obviated in accordance with the 'wireless' butt set of the present invention, in which a test set base station that is connectable directly to the line under test may be operated by wireless handset, that may remain attached to the base station, or removed to allow the craftsperson to remotely control the operation of the test set via a wireless phone. This allows a service technician to test a telephone line, without requiring that the craftsperson remain at the access location where the test set is physically connected to the line, thereby facilitating movement of the craftsperson as necessary to a location that may well beyond the length of the test set's line cord.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A test set for testing a telephone line comprising a test set base station that is connectable to and contains test circuitry for testing said telephone line, and a wireless telephone handset, that is configured to engage said base station as an integrated hand-held test set assembly, and to be detached therefrom, and wherein said wireless handset is controllably operative to wirelessly communicate with and control the operation of said base station, wherein said wireless telephone handset has an electrical receptacle that mates with an associated electrical connector installed in said base station when said base station and said wireless telephone handset are joined together, so as to provide a hardwired communication path between communication transceiver components of said base station and said wireless telephone handset.

2. A test set according to claim 1, wherein said test circuitry of said base station is configured to monitor said telephone line via said wireless telephone handset without going off-hook in response to a first prescribed operation of a talk switch of said wireless telephone handset.

3. A test set according to claim 2, wherein said test set is configured to go off-hook in response to a second prescribed operation of said talk switch of said wireless telephone handset.

4. A test according to claim 3, wherein said first prescribed operation of said talk switch comprises operating said talk switch once.

5. A test according to claim 4, wherein said second prescribed operation of said talk switch comprises operating said talk switch a second time within a prescribed time interval following a first operation of said talk switch.

6. A test set according to claim 2, wherein said test circuitry of said base station includes an auxiliary transformer—high impedance line monitoring circuit that is placed in circuit with said line and is operative to enable said line to be monitored via said wireless telephone handset in response to said first prescribed operation of said talk switch of said wireless telephone handset.

7. A test set according to claim 1, wherein said test set is configured to go off-hook in response to a double-click operation of a talk switch of said wireless telephone handset.

8. A test set according to claim 1, wherein said base station is configured to enable talk/monitor mode functionality thereof to be controlled by a talk mode switch of said wireless telephone handset.

9. A test set according to claim 8, wherein a talk mode signal path through said test set includes a wireless transceiver of said wireless telephone handset, and a wireless transceiver and a wireless telephone handset talk switch operation-responsive circuit of said base station.

10. A test set according to claim 9, wherein said base station includes a high impedance circuitry that is configured to monitor said telephone line via said wireless telephone handset without going off-hook in response to a first prescribed operation of a talk switch of said wireless telephone handset.

11. A test set according to claim 10, wherein said test set is configured to go off-hook in response to a second prescribed operation of said talk switch of said wireless telephone handset.

12. A test set according to claim 1, wherein said base station includes a battery charging circuit through which rechargeable batteries for powering the base station may be charged from an external power source, and a DC—DC converter for converting battery voltage to a requisite DC voltage level required to power circuitry of said base station.

13. A test set for testing a telephone line comprising a test set base station that contains test circuitry for testing said telephone line, and a wireless telephone handset that is configured to wirelessly communicate with and control the operation of said base station, said test circuitry of said base station being configured to monitor said telephone line via said wireless telephone handset without going off-hook, in response to a first prescribed operation of a talk switch of said wireless telephone handset, and to go off-hook in response to a second prescribed operation of said talk switch of said wireless telephone handset, wherein said wireless telephone handset has an electrical receptacle that mates with an associated electrical connector installed in said base station when said base station and said wireless telephone handset are joined together, so as to provide a hardwired communication path between communication transceiver components of said base station and said wireless telephone handset.

14. A test according to claim 13, wherein said first prescribed operation of said talk switch comprises operating said talk switch once, and said second prescribed operation of said talk switch comprises operating said talk switch a second time within a prescribed time interval following a first operation of said talk switch.

15. A test set according to claim 13, wherein said test circuitry of said base station includes an auxiliary transformer—high impedance line monitoring circuit that is placed in circuit with said line and is operative to enable said line to be monitored via said wireless telephone handset in response to said first prescribed operation of said talk switch of said wireless telephone handset.

16. A test set according to claim 13, wherein said base station is configured to enable talk/monitor mode functionality thereof to be controlled by a talk mode switch of said wireless telephone handset through a talk mode signal path that includes a wireless transceiver of said wireless telephone handset, and a wireless transceiver and a wireless telephone handset talk switch operation-responsive circuit of said base station.

17. A test set according to claim 13, wherein said base station includes a battery charging circuit through which rechargeable batteries for powering the base station may be charged from an external power source, and a DC—DC converter for converting battery voltage to a requisite DC voltage level required to power circuitry of said base station.

18. A test set according to claim 13, wherein said base station and said wireless telephone handset are configured to interfit physically and electrically engage one another as an integrated hand-held assembly.

19. A wireless butt set for testing a telephone line comprising a test set base station that is connect able to said telephone line and is configured to be operated by a wireless telephone handset, that is detachably connect able to said base station, so as to allow a craftsperson to directly or remotely control operation of said test set via said wireless telephone handset, and wherein test circuitry of said base station is configured to monitor said telephone line via said wireless telephone handset without going off-hook, in response to a first prescribed operation of a talk switch of said wireless telephone handset, and to go off-hook in response to a second prescribed operation of said talk switch of said wireless telephone handset, wherein said wireless telephone handset has an electrical receptacle that mates with an associated electrical connector installed in said base station when said base station and said wireless telephone handset are joined together, so as to provide a hardwired communication path between communication transceiver components of said base station and said wireless telephone handset.

* * * * *

UNITED STATES PATENT AND TRADEMARK OFFICE
CERTIFICATE OF CORRECTION

| | |
|---|---|
| PATENT NO. | : 6,252,942 B1 |
| DATED | : June 26, 2001 |
| INVENTOR(S) | : Edward J. Zoiss, Ronald S. Squires, Glen H. Humphrey, James D. Coleman, Linda L. Hathorn |

It is certified that error appears in the above-identified patent and that said Letters Patent is hereby corrected as shown below:

Column 1,
Line 60, delete "that may well beyond" insert -- that may be well beyond --

Column 6,
Line 55, delete "that may well beyond" insert -- that may be well beyond --

Colum 8,
Line 48, delete "connect able" insert -- connectable --
Line 50, delete "connect able" insert -- connectable --

Signed and Sealed this

Fifteenth Day of January, 2002

Attest:

JAMES E. ROGAN
*Director of the United States Patent and Trademark Office*

*Attesting Officer*